US012645672B2

(12) United States Patent
Luo et al.

(10) Patent No.: US 12,645,672 B2
(45) Date of Patent: Jun. 2, 2026

(54) QUERY SYSTEM USING MULTIPLE AI AGENTS FOR TEXT-TO-SQL AND TEXT-TO-PYTHON

(71) Applicant: Zscaler, Inc., San Jose, CA (US)

(72) Inventors: Gaoxiang Luo, Minneapolis, MN (US); Zixu Zhu, San Jose, CA (US); Kevin Pappas, Denver, CO (US); Charles Drummond-Hay, San Francisco, CA (US); Rahavan Raman, Toronto (CA)

(73) Assignee: Zscaler, Inc., San Jose, CA (US)

( * ) Notice: Subject to any disclaimer, the term of this patent is extended or adjusted under 35 U.S.C. 154(b) by 0 days.

(21) Appl. No.: 18/829,858

(22) Filed: Sep. 10, 2024

(65) Prior Publication Data

US 2026/0072908 A1 Mar. 12, 2026

(51) Int. Cl.
*G06F 16/2452* (2019.01)
(52) U.S. Cl.
CPC .............................. *G06F 16/24522* (2019.01)
(58) Field of Classification Search
CPC ................................................ G06F 16/24522
See application file for complete search history.

(56) References Cited

U.S. PATENT DOCUMENTS

| | | |
|---|---|---|
| 2018/0095962 A1 | 4/2018 | Anderson et al. |
| 2020/0034362 A1 | 1/2020 | Galitsky |
| 2023/0283639 A1 | 9/2023 | Melson et al. |

| | | |
|---|---|---|
| 2023/0385708 A1 | 11/2023 | Lee et al. |
| 2024/0039954 A1 | 2/2024 | Shete et al. |
| 2024/0064178 A1 | 2/2024 | Shete et al. |
| 2024/0129338 A1 | 4/2024 | Azad et al. |
| 2024/0163312 A1 | 5/2024 | Azad et al. |
| 2024/0256890 A1 | 8/2024 | Lee et al. |
| 2024/0275701 A1 | 8/2024 | Petla et al. |
| 2025/0045256 A1* | 2/2025 | Gottlob ................. G06F 16/211 |
| 2025/0173330 A1* | 5/2025 | Durg ..................... G06F 16/243 |

(Continued)

OTHER PUBLICATIONS

Wang, MAC-SQL: A Multi-Agent Collaborative Framework for Text-to-SQL, pp. 1-18, Jun. 17, 2024.*

(Continued)

*Primary Examiner* — Albert M Phillips, III
(74) *Attorney, Agent, or Firm* — Baratta Law PLLC; Lawrence A. Baratta, Jr.

(57) ABSTRACT

Systems and methods are provided for enabling search and query functions. A query system having a framework, executed on one or more processors, includes a plurality of Artificial Intelligence (AI) agents working to support one of text-to-Structured Query Language (SQL) or text-to-Python, wherein the plurality of AI agents include a first AI agent prompted to act as a research analyst for performing a task of interpreting a natural language query from a user, wherein the natural language query relates to natural language to the one of text-to-SQL or text-to-Python; a second AI agent prompted to act as a search data engineer for performing a task of executing a search based on the natural language query; and a third AI agent prompted to act as a code developer for performing a task of writing code based on the search, wherein the plurality of AI agents act autonomously yet collaboratively.

20 Claims, 8 Drawing Sheets

(56) References Cited

U.S. PATENT DOCUMENTS

2025/0284670 A1 * 9/2025 Lanfranchi ........... G06F 16/213

OTHER PUBLICATIONS

Qian, ChatDev: Communicative Agents for Software Development, pp. 1-13, Jun. 5, 2024.*
Dibia, LIDA: A Tool for Automatic Generation of Grammar-Agnostic Visualizations and Infographics using Large Language Models, pp. 1-14, Jun. 6, 2023.*

* cited by examiner

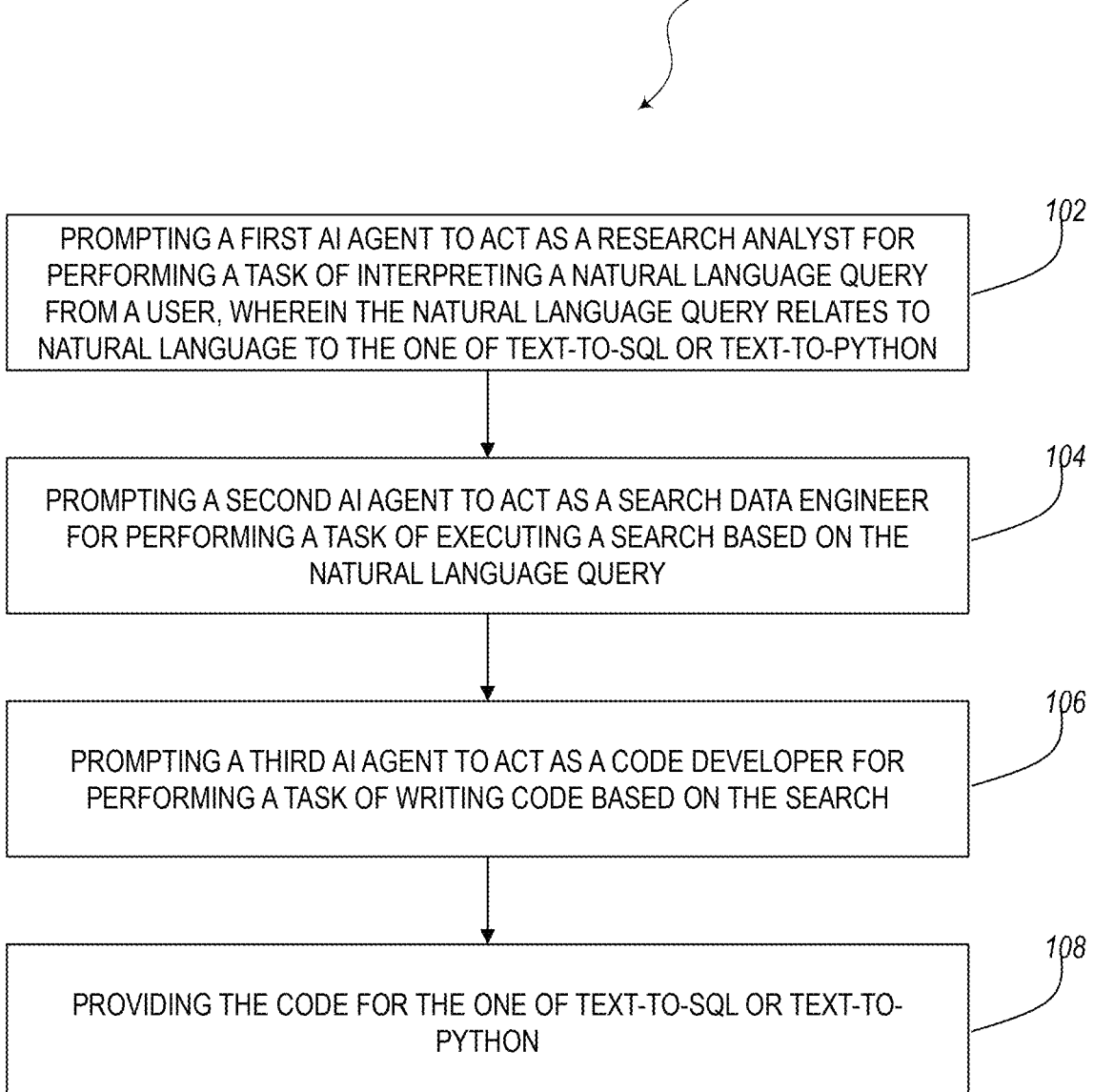

*100*

*102*

PROMPTING A FIRST AI AGENT TO ACT AS A RESEARCH ANALYST FOR PERFORMING A TASK OF INTERPRETING A NATURAL LANGUAGE QUERY FROM A USER, WHEREIN THE NATURAL LANGUAGE QUERY RELATES TO NATURAL LANGUAGE TO THE ONE OF TEXT-TO-SQL OR TEXT-TO-PYTHON

*104*

PROMPTING A SECOND AI AGENT TO ACT AS A SEARCH DATA ENGINEER FOR PERFORMING A TASK OF EXECUTING A SEARCH BASED ON THE NATURAL LANGUAGE QUERY

*106*

PROMPTING A THIRD AI AGENT TO ACT AS A CODE DEVELOPER FOR PERFORMING A TASK OF WRITING CODE BASED ON THE SEARCH

*108*

PROVIDING THE CODE FOR THE ONE OF TEXT-TO-SQL OR TEXT-TO-PYTHON

FIG. 11

QUERY SYSTEM USING MULTIPLE AI AGENTS FOR TEXT-TO-SQL AND TEXT-TO-PYTHON

TECHNICAL FIELD

The present disclosure generally relates to data analysis, Business Intelligence (BI), and query/search systems. More particularly, the present disclosure relates to systems and methods for converting natural language queries to Structured Query Language (SQL) queries and Python queries using a multi-agent framework and Large Language Models (LLMs).

BACKGROUND

In the realm of data analysis, the user task of querying databases typically requires knowledge of SQL, which can be a barrier for non-technical users. Existing solutions, such as Business Intelligence (BI) tools and pre-built dashboards, offer limited permutations for data exploration and require significant manual setup and maintenance. Single Large Language Model (LLM) approaches and chain-based LLM methods often lack mechanisms to ensure the correctness of generated SQL queries, leading to potential inaccuracies in query results.

BRIEF SUMMARY

The present disclosure is directed to systems and methods for establishing query systems for receiving user queries and replying with appropriate answers. According to one implementation, a query system may have a framework with a plurality of AI agents. For example, the query system may include one AI agent prompted to act as the research analyst for performing a task of interpreting a natural language query from a user. Another AI agent may be prompted to act as the search data engineer for performing a task of executing a search based on the natural language query. Also, another AI agent may be prompted to act as the chat manager for performing a task of enabling the plurality of AI agents to act autonomously yet collaboratively in a group chat environment. A further AI agent as a project manager for planning, such as to decompose tasks into sub-tasks and assign to other AI agents.

In some embodiments, the chat manager may be further configured to a) manage interactions among the AI agents, b) determine which the AI agents perform their respective tasks, and c) broadcast results obtained by one AI agent (upon performing its respective task) to other AI agents. The query system may further include another AI agent prompted to act as the search evaluator for performing a task of evaluating whether data obtained by the search data engineer when executing the search is relevant. In response to determining that results of executing the search are not relevant, the search evaluator may be configured to provide feedback to the search data engineer.

The query system may further include another AI agent prompted to act as the code developer for performing a task of writing code for assisting the search data engineer with executing the search. In some embodiments, the code developer may be a text-to-SQL developer and may be configured to write SQL code for assisting the search data engineer with queries related to general data and customer health. In some embodiments, the code developer may be a text-to-visualization (Python) developer and may be configured to write Python code for assisting the search data engineer with queries related to visualization of data. According to some embodiments, the query system may further include another AI agent prompted to act as the code evaluator for performing a task of evaluating the code written by the code developer. The code evaluator, for example, may further be configured to provide feedback to the code developer for improving SQL queries and Python queries that do not meet validation criteria.

Furthermore, according to some implementations, the search data engineer may include a hybrid retrieval system configured to provide functions related to one or more of a) a semantic search, b) a keyword search, c) reranking, and d) score fusion. The semantic search, for instance, may be configured to leverage text-embedding models for storing and retrieving textual information based on cosine similarity. The research analyst 16, according to various embodiments, may further be configured to augment the natural language query from the user to improve search relevance.

According to some embodiments, each of the plurality of AI agents may include a) a tool component, b) a planning component, c) a reasoning component, d) memory, and/or other suitable software and/or hardware elements. In some cases, the query system may include a semantic layer that sits on top of an enterprise database for establishing a consistent data representation scheme. Also, the research analyst may be further configured to present additional information (e.g., in a user interface) to the user, upon request, of operational steps of one or more of the plurality of AI agents.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIG. 11 is a flow diagram illustrating a method for using a multi-agent query system, according to various embodiments.

DETAILED DESCRIPTION

Figure 1:
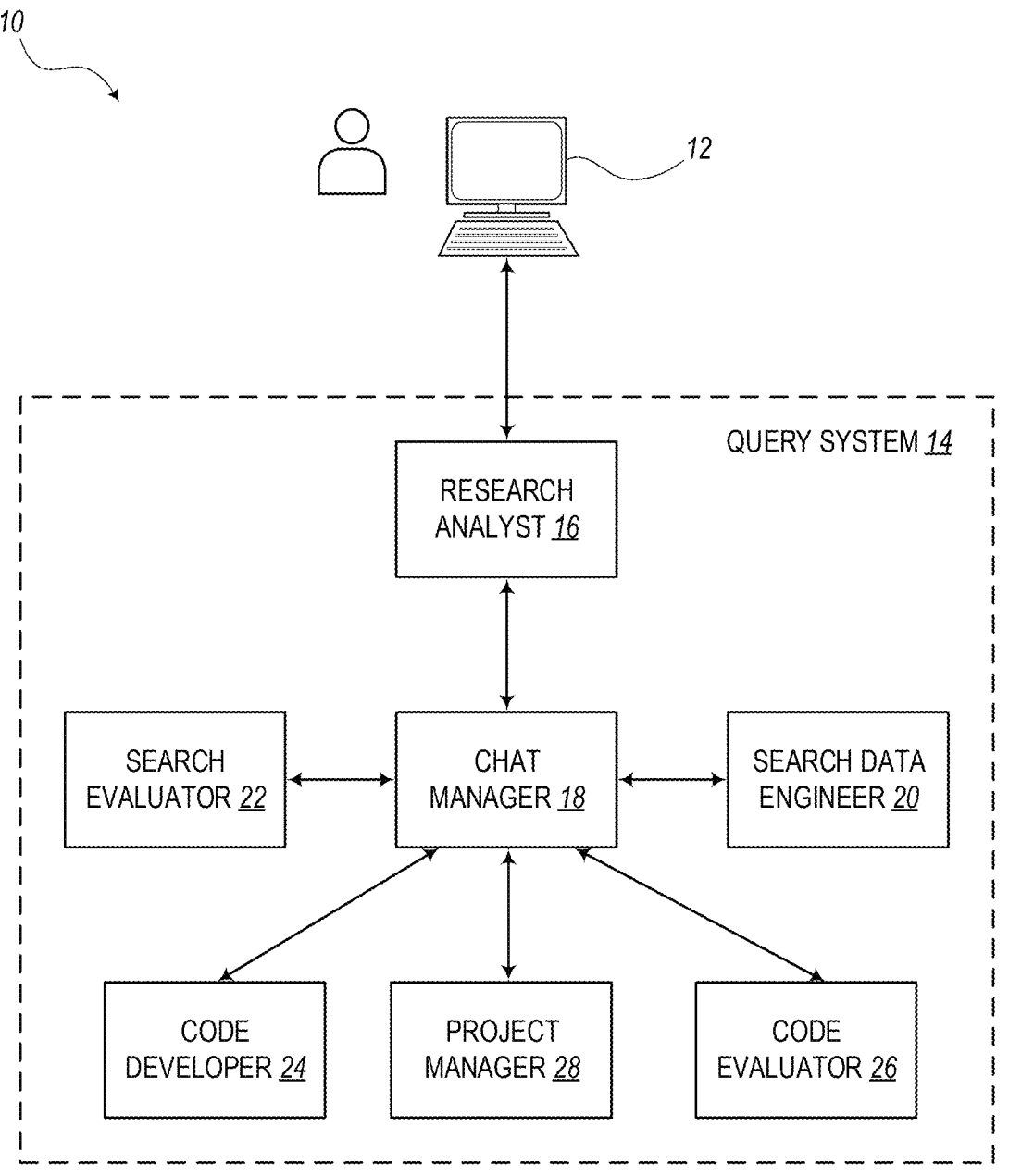
FIG. 1 is a diagram illustrating a query system utilizing a plurality of AI agents, the query system allowing a user to conduct a query, according to various embodiments.

The present disclosure relates to systems and methods for conducting queries or searches for end users. In Business Intelligence (BI) environments, an executive may wish to determine how an organization (e.g., enterprise, business, company, etc.) is performing with respect to a number of different criteria. Searches may be conducted on private data stored in enterprise databases to determine Annual Recurring Revenue (ARR) and other factors that may indicate the health of the organization. In some cases, an administrator or technician working for the organization may interact with data using query systems using a suitable query language (e.g., Structured Query Language (SQL), etc.). It may be beneficial to use query systems that are able to provide various insights into the private data associated with the organization and allow this data to be easily accessible for various personnel, even people who do not necessarily have expertise in SQL or query system functionality.

The systems and methods of the present disclosure are configured to operate on the principle of utilizing multiple agents to perform specific tasks for completing a search. Thus, if one agent makes a mistake or is directed towards uncovering some search result "hallucination," the other agents collaboratively working with this agent can steer the search in the right direction. Therefore, a role of one agent may be to evaluate the results that are obtained by other agents. Another feature of the present disclosure is the role of particular agent for managing a chat session (e.g., chat room) among all the agents. In this way, each independent (or autonomous) agent can work in conjunction with the other agents to perform various roles while also cooperatively working with the query system to conduct a useful and relevant search.

The query systems described in the present disclosure may be considered to be a "one-stop interface" that allows a user to conversationally "talk with their data" using Natural Language Processing (NLP). In particular, the present disclosure relates to systems and methods for providing a multi-agent Large Language Model (LLM) framework configured to solve text-to-SQL tasks, among other tasks. The systems and methods of the present disclosure allow users to ask data-related questions in natural language and, in response, generate accurate SQL queries to retrieve the desired information. The multi-agent framework ensures the accuracy and relevance of the SQL queries by incorporating "critic" agents (e.g., "evaluators," "reviewers," "validators," "admin," etc.) that review and validate the output at each step. This approach overcomes the limitations of existing technologies by enabling free-form data exploration and providing a scalable, intelligent workflow for enterprise data management.

One motivation for the construction of the systems and methods of the present disclosure is to address the inherent nature of various types of query scenarios whereby in order to really understand data, an inquirer may need to talk to many different people (e.g., multiple eye witnesses, multiple references, multiple sources, etc.). For example, it would behoove an inquirer (e.g., detective, inspector, journalist, investigator, etc.) to speak with many people, such as Subject Matter Experts (SMEs). In the realm of data enquiries, an investigator may wish to talk to a data engineer.

In addition, an investigator may need to know how to use their respective tools. Again, with respect to data queries, a user (or investigator) may need to know how to use the BI tools and may need to know how to write query languages to interact with the data. In this way, they can uncover relevant data, which may be in the form of data visualization graphs, charts, tables, etc. An organization may employ many dedicated employees to support business databases, create access and data enablement functionality, and fulfill other needs throughout the organization to allow other employees to find, analyze, and consume the relevant data. The query systems of the present disclosure are configured to enable easy data searching and to inexpensively draw out of fixed dashboards so as to increase discoverability.

One particular use of such query systems, for example, may include obtaining data from enterprise databases to determine the "customer health" of customers who pay the enterprise for goods or services. Customer health, which may related to Quality of Experience (QoE) or Quality of Service (QoS) metrics, can also be associated with churn rates (i.e., rate at which customers stop paying for the goods or services). Thus, customer health and churn rate may be considered to be inversely proportional to each other. In the query environment, efficient methodologies are needed to identify and understand key risk signals regarding churn and to provide potential solutions for the reduction of churn.

Therefore, the systems and methods described in the present disclosure are configured to provide solutions to these challenges of organization. The query systems described herein are configured, for instance, to perform Retrieval-Augmented Generation (RAG) based QA functionality to allow a user to ask questions about customer health data (or other data) and then help the user find relevant information. In some embodiments, the query systems described herein can also perform text-to-SQL functions, which can thereby eliminate a need for the user to understand the SQL language. The user can ask for specific data or ask relevant questions and the present query systems can help by writing SQL queries that can be forwarded to a search engine. Also, in some embodiments, the query systems can perform validation functionality for the user to verify that the answers are legitimate and not hallucinations. Also, the user can use natural language to ask questions, and the query systems can convert this natural language into SQL or Python code as needed. Thus, the query systems are also capable of text-to-visualization conversion.

Multi-Agent Query System

FIG. 1 is a diagram illustrating an embodiment of a communication system 10 in which a user (e.g., customer, customer success manager, sales engineer, executive, administrator, external client, or another person who may rely on data insights in large data sets) can utilize an end user device 12 to correspond with a query system 14. In particular, the query system 14 may include a structure or framework that includes a plurality of AI agents. For example, the query system 14 may be part of an enterprise domain for handling data that is private or confidential and only accessible to some or all employees of the organization or enterprise. In some embodiments, the query system 14 may also be a cloud-based system that can interact with the end user device 12 over a public network (e.g., the Internet).

As shown in the embodiment of FIG. 1, the query system 14 includes multiple AI agents, some of which may be configured as Large Language Model (LLM) agents and/or may include an LLM. This multi-agent framework of the query system 14 allows each AI agent to operate as an autonomous or independent component. Although each AI agent is autonomous, the AI agents in combination are configured to act cooperatively in a collaborative environment to perform search queries for the end user device 12. In particular, each AI agent may be instructed or prompted to act in a specific role and/or to perform certain functionality.

In the embodiment shown in FIG. 1, the query system 14 Includes an AI agent that acts as a research analyst 16, an AI agent that acts as a chat manager 18, an AI agent that acts as a search data engineer 20, an AI agent that acts as a search evaluator 22, an AI agent that acts as a code developer 24, and an AI agent that acts as a code evaluator 26. The chat manager 18 (e.g., project manager agent) is configured to create a group chat session whereby each AI agent is allowed to interact with the other AI agents (e.g., as if in a chat room). The results of various functions by one AI agent can be shared in this chat environment with the other AI agents to thereby allow cooperation as well as correction (as needed) in the process of crafting a response to a user query. The query system 14 can include a further AI agent as a project manager 28 for planning, such as to decompose tasks into sub-tasks and assign to other AI agents.

The query system 14, which includes a multi-agent text-to-SQL framework includes several agents that are configured to interact within the group chat environment to collaboratively generate and validate SQL queries. Communication among various AI agents can be supported by the chat manager 18. The chat manager 18, which may include an LLM, can oversee the operations of the various AI agents and schedule times when each AI agent is configured to operate in their own unique capacity.

In operation, the user may enter a natural language query via the end user device 12, which may be forwarded to the research analyst 16. The research analyst 16, which may include another LLM, is configured to receive and interpret the user's natural language query and invoke a search engine (e.g., search data engineer 20). Next, the search data engineer 20, which may access one or more other LLMs, is configured to execute the search and returns results. The research analyst 16 may further be configured to extract semantic information from the search results. The search evaluator 22, which may include another LLM, may be configured to analyze or evaluate extracted documents, tables, etc. retrieved from an enterprise database to determine if the search results are valid. If the search results do not meet certain criteria, the research analyst 16 may be configured to edit search query language until relevant data is retrieved.

When it is determined that the retrieved data resources are valid, the code developer 24, which may include another LLM, may be configured to generate query code in any suitable query language (e.g., SQL, Python, etc.). Thus, the code developer 24 can generate SQL code based on extracted semantic information to conduct certain types of searches, such as a key-work search or a search related to data formatted within a suitable table schema. In other embodiments, the code developer 24 can generate Python code based on extracted semantic information to conduct certain types of searches, such as a search related to a visualization of data (e.g., data presented in a table, chart, graph, etc.). The code evaluator 26 (e.g., SQL critic agent, Python critic agent, admin agent, etc.), which may include yet another LLM, is configured to review, evaluate, validate, and/or analyze the code generated by the code developer 24 to determine if the code is valid. In some embodiments, the code evaluator 26 may utilize a sandbox-type environment that is separate from the other AI agents. When the generated code is validated, the search data engineer 20 may be configured to run a search query based on the code.

The search data engineer 20 may include or may be configured to operate with a suitable search engine. The search engine may include at least two parts, one for conducting a keyword search and another for conducting a search based on code generated by the code developer 24 and validated by the code evaluator 26. The search engine utilized in the query system 14 may be a hybrid retrieval system that combines functions including at least a semantic search, keyword search, reranking, and/or score fusion. The search engine may be responsible for retrieving relevant table schemas based on the user's query.

The research analyst 16 and/or search evaluator 22 may be configured to evaluate the relevance of the search results from the search data engineer 20 and may be configured to extract necessary semantic information. For example, the semantic information may include column descriptions, table schemas, sample values, data types, etc. If the results are not relevant, the research analyst 16 and/or search evaluator 22 may be configured to augment the user query appropriately for better search results. Also, the code evaluator 26 may be configured to review the generated code (e.g., SQL query, Python query, etc.) against a set of criteria. If the code meets predetermined criteria, it is passed to the search data engineer or to another AI agent acting as a "code data engineer" (not shown) for execution. If the code does not meet the criteria, the code evaluator 26 may be configured to provide feedback for improvement and the code developer 24 may then generate a new coded query.

Figures 8, 9:
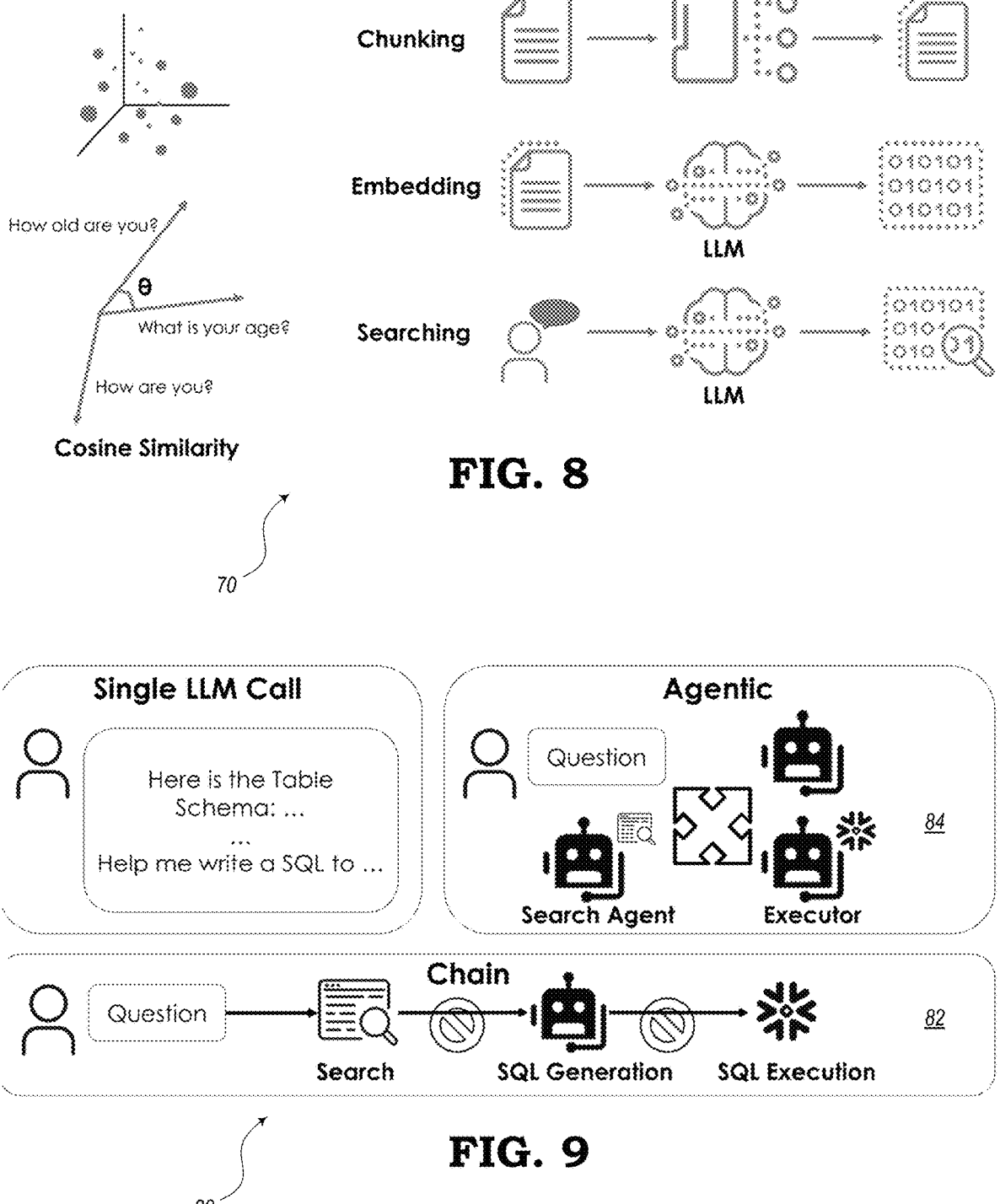
FIG. 8 is a diagram illustrating how semantic retrieval works, according to various embodiments.
FIG. 9 is a diagram illustrating differences between a chain-based search and the multi-agent framework of the query system of FIG. 1, according to various embodiments.

Regarding the algorithms and methodologies of the query system 14, the AI agents may use LLMs for natural language understanding and code (e.g., SQL) conversion and generation. Semantic searches leverage text-embedding models to store and retrieve textual information, which may be based on cosine similarity (e.g., as shown in FIG. 9). When implemented in Python, the query system 14 may be configured to utilize the AutoGen multi-agent framework.

Therefore, it may be noted that an application of the query system 14 is to enable users to interact with their data using natural language queries. This capability eliminates the need for SQL knowledge, allowing users to explore data beyond predefined dashboards and gain insights more easily.

The query system 14 therefore includes a number of advantages with respect to conventional search systems. For example, the multi-agent framework of the query system 14 may be configured to ensure the correctness of SQL queries by incorporating validation steps. Also, the query system 14 may support free-form data exploration, overcoming the limitations of traditional BI tools and dashboards. Furthermore, the query system 14 provides an intelligent workflow that is scalable and adaptable to new datasets and use cases.

Therefore, according to various embodiments of the present disclosure, the query system 14 may have a framework with a plurality of AI agents. For example, the query system 14 may include one AI agent prompted to act as the research analyst 16 for performing a task of interpreting a natural language query from a user. Another AI agent may be prompted to act as the search data engineer 20 for performing a task of executing a search based on the natural language query. Also, another AI agent may be prompted to act as the chat manager 18 for performing a task of enabling the plurality of AI agents to act autonomously yet collaboratively in a group chat environment.

The chat manager 18 may be further configured to a) manage interactions among the AI agents, b) determine which the AI agents perform their respective tasks, and c) broadcast results obtained by one AI agent (upon performing its respective task) to other AI agents. The query system 14 may further include another AI agent prompted to act as the search evaluator 22 for performing a task of evaluating whether data obtained by the search data engineer when executing the search is relevant. In response to determining that results of executing the search are not relevant, the search evaluator 22 may be configured to provide feedback to the search data engineer 20.

The query system 14 may further include another AI agent prompted to act as the code developer 24 for performing a task of writing code for assisting the search data engineer 20 with executing the search. In some embodiments, the code developer 24 may be a text-to-SQL developer and may be configured to write SQL code for assisting the search data engineer 20 with queries related to general data and customer health. In some embodiments, the code developer may be a text-to-visualization developer and may be configured to write Python code for assisting the search data engineer 20 with queries related to visualization of data. According to some embodiments, the query system 14 may further include another AI agent prompted to act as the code evaluator 26 for performing a task of evaluating the code written by the code developer 24. The code evaluator 26, for example, may further be configured to provide feedback to the code developer 24 for improving SQL queries and Python queries that do not meet validation criteria.

Furthermore, according to some implementations, the search data engineer 20 may include a hybrid retrieval system configured to provide functions related to one or more of a) a semantic search, b) a keyword search, c) reranking, and d) score fusion. The semantic search, for instance, may be configured to leverage text-embedding models for storing and retrieving textual information based on cosine similarity. The research analyst 16, according to various embodiments, may further be configured to augment the natural language query from the user to improve search relevance.

According to some embodiments, each of the plurality of AI agents may include a) a tool component, b) a planning component, c) a reasoning component, d) memory, and/or other suitable software and/or hardware elements. In some cases, the query system 14 may include a semantic layer (e.g., as described with respect to FIG. 11) that sits on top of an enterprise database for establishing a consistent data representation scheme. Also, the research analyst 16 may be further configured to present additional information (e.g., in a user interface of the end user device 12) to the user, upon request, of operational steps of one or more of the plurality of AI agents.

AI Agents

An AI agent is a software entity that operates autonomously to perform tasks or make decisions. These AI agents are typically designed to simulate human-like intelligence, using algorithms and machine learning models to process data, understand contexts, and generate outputs. In one embodiment, AI agents can be specialized for various domains, such as a project manager, researcher, searcher, SQL or Python generator, SQL or Python critic, SQL or Python data executor, etc. They continuously learn from interactions and feedback, enabling them to improve their performance over time. By leveraging large datasets, AI agents can analyze patterns, predict outcomes, and make informed decisions, often in real-time.

The primary difference between an AI agent and a Large Language Model (LLM) lies in their scope, purpose, and functionality. An AI agent is a software entity designed to autonomously perform tasks on behalf of a user or system. It can take inputs from its environment, process those inputs based on its programming or learned behavior, and then act or make decisions to achieve specific goals. AI agents often encompass various AI technologies, including machine learning models, rule-based systems, and reinforcement learning, and they can interact with other systems or users in real-time. Examples include chatbots, recommendation systems, or autonomous vehicles.

In contrast, a Large Language Model (LLM) is a specific type of AI model designed to understand and generate human-like text based on patterns in large datasets. LLMs, such as GPT, are trained on vast amounts of text data to predict and generate coherent responses to textual inputs. While LLMs excel at tasks related to natural language processing, like text generation, translation, and summarization, they are not complete AI agents themselves. Instead, LLMs serve as powerful components that can be integrated into AI agents to handle language-related tasks. Therefore, an AI agent is a broader concept encompassing autonomous decision-making systems, while an LLM is a specialized tool focused on language understanding and generation.

Computer System

Figure 2:
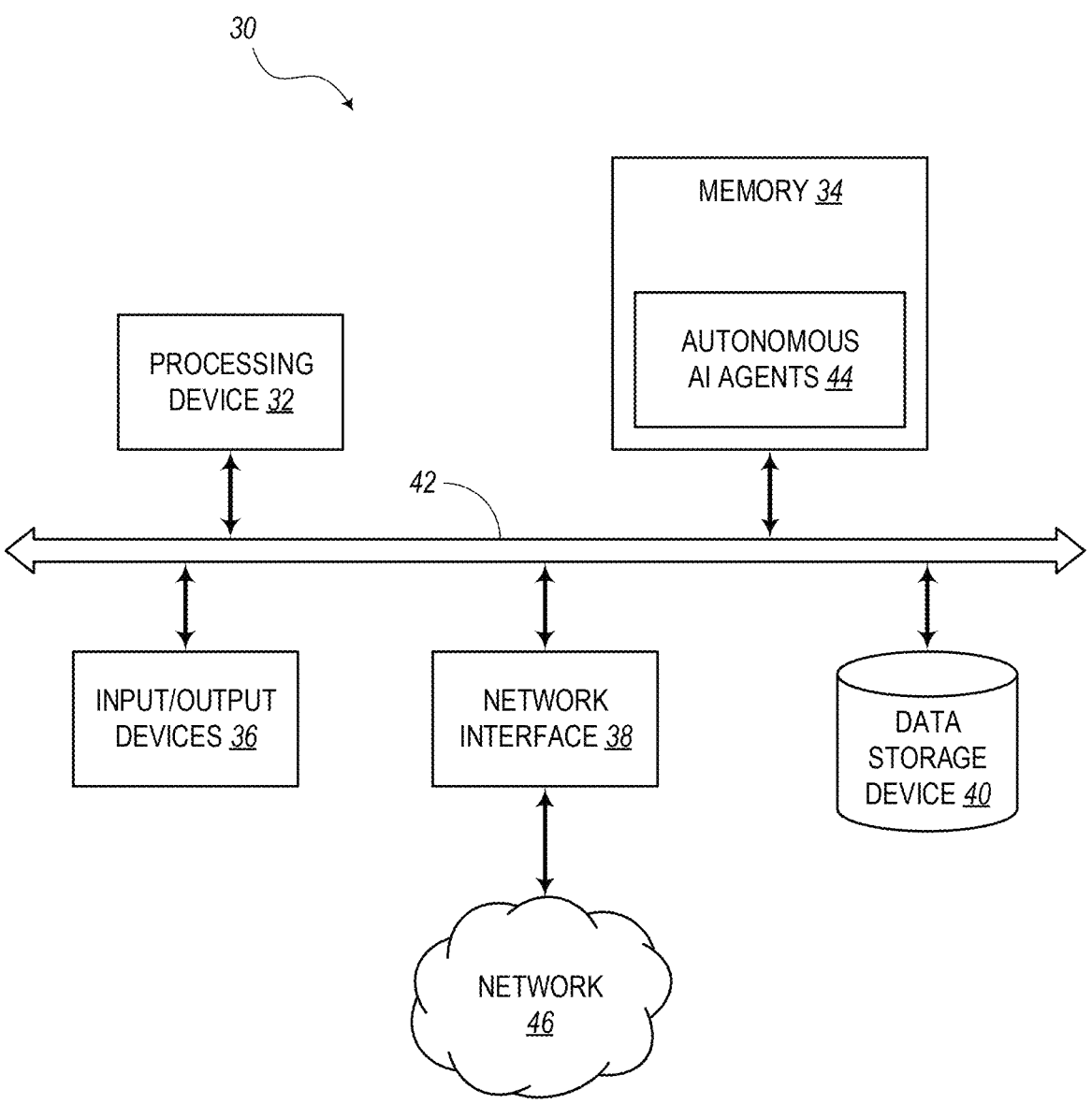
FIG. 2 is a diagram illustrating a system for enabling a user to conduct queries, according to various embodiments.

FIG. 2 is a diagram illustrating an embodiment of a system 30 for enabling a user to conduct search queries within an enterprise domain or via a remote cloud-based transaction. In the illustrated embodiment, the system 30 may be a digital computing device that generally includes a processing device 32, a memory 34, Input/Output (I/O) devices 36, a network interface 38, and a data storage device 40. It should be appreciated that FIG. 2 depicts the system 30 in a simplified manner, where some embodiments may include additional components and suitably configured processing logic to support known or conventional operating features. The components (i.e., 32, 34, 36, 38, 40) may be communicatively coupled via a local interface 42. The local interface 42 may include, for example, one or more buses or other wired or wireless connections. The local interface 42 may also include controllers, buffers, caches, drivers, repeaters, receivers, among other elements, to enable communication. Further, the local interface 42 may include address, control, and/or data connections to enable appropriate communications among the components 32, 34, 36, 38, 40.

The processing device 32 of the system 30 disclosed herein may include a central processing unit (CPU) operatively connected to the memory 34, I/O devices 36, and network interface 38. The CPU is configured to execute instructions stored in the memory 34 to perform various computing tasks. For example, the processing device 32 may allow multiple autonomous AI agents 44, stored in the memory 34, to perform the functions of conducting a query for a user as described with respect to FIG. 1.

The memory 34 may include volatile memory such as random access memory (RAM) for temporary data storage and non-volatile memory such as read-only memory (ROM) for storing essential system instructions. The I/O devices 36 may facilitate communication with external peripherals and users, including keyboards, mice, displays, printers, etc. The network interface 38, for example, may be configured for communication over a network 46. The network interface 38 enables data exchange between the computer system and external entities, facilitating connectivity and information transfer.

Additionally, the computer system may incorporate various hardware components and subsystems such as graphics processing units (GPUs), sound cards, and expansion slots for accommodating additional peripheral cards. These components enhance the system's capabilities for multimedia processing, audio/video playback, and expansion options for future upgrades or customizations. Furthermore, the local interface 42 (or bus interface) facilitates communication between different internal components, ensuring efficient data transfer and coordination.

The system 30 may also be equipped with a power supply unit (PSU) to provide electrical power to all internal components, ensuring proper functionality and operation. The PSU may include voltage regulation mechanisms and safety features to protect against power surges and fluctuations, thereby safeguarding the integrity of the system and connected peripherals.

In conjunction with the hardware components, the system 30 (e.g., computer) may include software components such as operating systems, device drivers, and application programs, in addition to the autonomous AI agents 44. These software elements enable the system 30 to manage hardware resources efficiently, execute user commands, and run various applications tailored to specific tasks or purposes. Additionally, the data storage device 40 (e.g., one or more internal or external databases) may be configured for storing and managing data, providing efficient access and retrieval capabilities.

Overall, the disclosed system 30 represents a comprehensive platform for performing computational tasks, facilitating communication, and interacting with users and external devices. Its combination of hardware and software components, including the processing device 32 (and other processors), network interface 38, data storage device 40, and local interface 42 (or bus), provides a versatile and scalable computing environment suitable for a wide range of applications across various industries and domains, including the execution of query searches using the multiple autonomous AI agents 44.

Therefore, according to some embodiments, the system 30 may include the processing device 32 and a memory device (e.g., memory 34) configured to store a plurality of AI agents (e.g., autonomous AI agents 44) for conducting queries. The plurality of AI agents may each include instructions that, when executed, enable the processing device 32 to prompt one AI agent to act as a research analyst 16 for performing a task of interpreting a natural language query from a user. Also, the instructions may enable the processing device 32 to prompt another AI agent to act as a search data engineer 20 for performing a task of executing a search based on the natural language query. Furthermore, the instructions are configured to enable the processing device 32 to prompt yet another AI agent to act as a chat manager 18 for performing a task of enabling the plurality of AI agents to act autonomously yet collaboratively in a group chat environment.

The systems and methods of the present disclosure are configured to leverage a multi-agent LLM framework to solve text-to-SQL tasks. With respect to text-to-SQL, the user can use natural language to ask data-related questions, and the system 30 is configured to write an SQL query to provide an answer to the questions.

LLMs may be capable of solving text-to-SQL if explicitly given semantic information (e.g., table schema, column descriptions, sample values, etc.). However, an LLM can sometimes make errors because it is constructed as a generative model by nature. In some cases, there are technologies that can use langchain to have a pre-defined string of actions, such as collecting semantic information and then invoking an LLM. However, if any of the steps are wrong, the final answer will be wrong. The systems and methods of the present disclosure are configured to leverage a multi-agent framework to jump out of pre-defined actions while allowing an LLM to collaboratively solve the task. If any of the steps, such as gathering information, generates SQL code that produces an error or goes wrong in some other way, the code evaluator 26 (e.g., critic agent) is configured to critique the answer, analyze whether or not the answer is flawed, and provides improvement suggestions when errors are detected.

Again, the autonomous AI agents 44 (e.g., AI agents 16, 18, 20, 22, 24, 26) are configured to "join" a group chat, as established by the chat manager 18. The research analyst 16, acting as the agent on behalf of the user's question, is configured to invoke the search engine, which is configured as the search data engineer 20 or is fed searches from the search data engineer 20. The search engine (or search data engineer 20) may be configured as a typical hybrid search that consists of sematic search, keyword search, rerank, and score fusion. The search data engineer 20 is an AI agent that is configured to execute the search and return the search results to the group chat.

The search evaluator 22 (or research analyst 16) may be configured to evaluate whether the returned search results are relevant to the user's question by a list of criteria. If so, it will extract the relevant semantic information, which may include column description, table schemas, sample values, data type, etc. The search engine and/or search data engineer 20 may essentially be configured to search for relevant table schemas. If the extracted information is not relevant, the research analyst 16 may be configured to augment the user question and produce a form that is more descriptive and may more easily find the relevant table schemas. Once relevant table schemas are received, the code developer 24 (e.g., SQL generation agent) may be configured to write an SQL query. The code evaluator 26 (e.g., SQL critic agent) may be configured to review the SQL query based on a list of criteria. If the score is above an acceptable threshold level, the search data engineer 20 (e.g., search engine, SQL data engineer, etc.) may be configured to execute the SQL query. If the score does not meet the acceptable threshold level, the code evaluator 26 (e.g., SQL critic agent) may be configured to provide feedback for improvement and may ask the code developer 24 (e.g., SQL generator agent) to write a new SQL query.

Each of the autonomous AI agents 44 may include a unique LLM, while in some embodiments LLMs may be shared among some autonomous AI agents 44. The LLMs may be configured as a type of deep learning algorithm that can perform a next-word prediction task. One key methodology used in the system 30 may include a semantic search, which leverages text-embedding models to store textual information as vectors in a vector database, and during inference time retrieval the relevant information based on cosine similarity.

The query system 14, system 30, and/or other similar solutions, which may be conceived based on knowledge of the present disclosure, may include BI tools, prebuild data boards, APIs, dashboards, etc. The solutions may have a definite numbers of permutations that limit the user's ability to discover data. Also, since time and resources are typically invested to support business data enablement and needs, using multi-agent text-to-SQL systems, as defined in the present disclosure, can offer a one-stop interface for data discovery.

Some conventional systems may include pre-LLM technologies (e.g., rule-based systems to find the SQL query), BI tools, and prebuilt dashboards. For some LLM-relevant techniques, there is single LLM call by stuffing table schemas and also chain-liked LLM by collecting relevant table schemas and then generate but does not have guarantees of correctness. In contrast to these conventional systems, the embodiments of the present disclosure may use LLMs or other generative models instead of rule-based systems that are not scalable. Also, the present embodiments allow users to perform free-form data exploration beyond predetermined permutations of dashboards. The query system 14 and system 30 intelligently gather critical information such as semantic information and table schemas, perform SQL generation, and have evaluators (i.e., search evaluator 22 and code evaluator 26) and/or other critic agents on both searching and SQL writing. These evaluators can ensure that a desired output returns to the users if the user query can feasibly be answered with a SQL.

General Multi-Agent Systems

Figure 3:
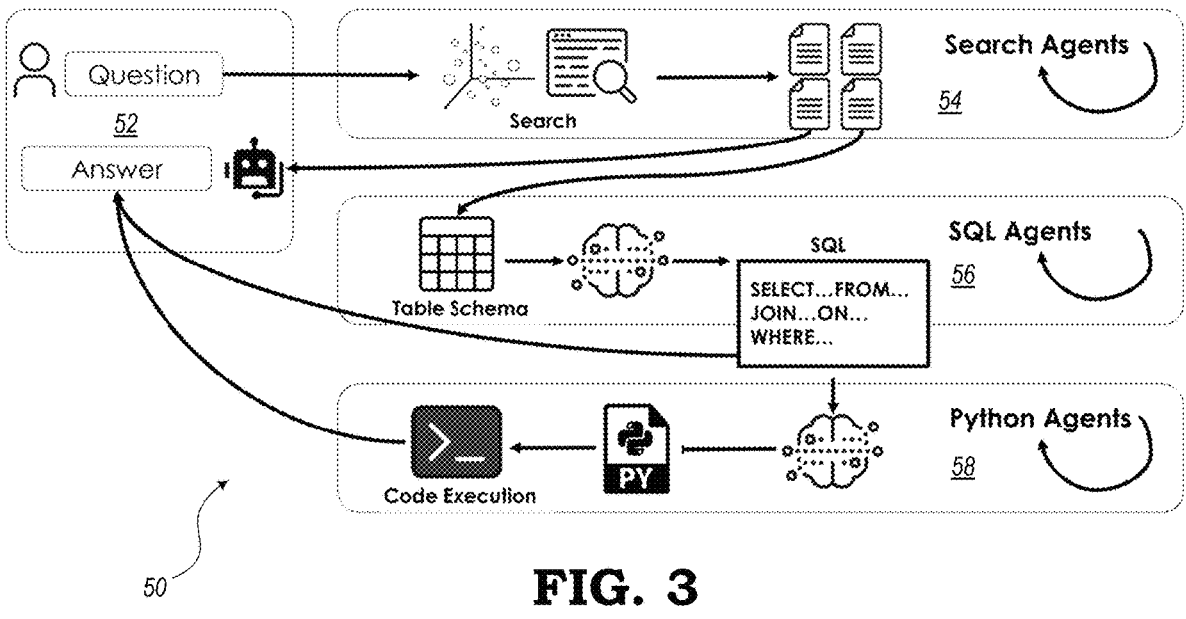
FIG. 3 is a diagram illustrating a multi-agent data flow, according to various embodiments.

FIG. 3 is a diagram showing an embodiment of a multi-agent data flow in a multi-agent system 50 (e.g., tabular generative search system). The multi-agent system 50, according to the illustrated embodiment, includes a User Interface (UI) 52 allowing a user to enter a question and view an answer. Also, the multi-agent system 50 may include search agents 54, SQL agents 56, and Python agents 58. For example, each set of the search agents 54, SQL agents 56, and Python agents 58 may include one or more LLMs. Search results obtained by the search agents 54 may be provided back to the UI 52 and/or forwarded as table schema for use by the SQL agents 56. The SQL agents 56 may write SQL code for search purposes, the results of which can be provided to the UI 52 or forwarded to the Python agents 58. The Python agents 58 may also execute code for search purposes and provide solutions to the UI 52.

The SQL agents 56 may be configured as text-to-SQL agents for converting user text into SQL code to create a relevant SQL search. The user may ask a data-relevant question and, in response, the multi-agent system 50 can a) help generate an SQL query, b) validate it, and c) execute it. An example of a type of question that may be handled by the SQL agents 56 may be considered to be a "data-relevant" query, such as, "What are the top churn risk accounts by ARR in April 2024? Rank them by churn risk." In response, the SQL agents 56 can create the appropriate SQL code and the multi-agent system 50 can respond to the user with a relevant answer.

The Python agents 58 may be configured as text-to-visualization agents for converting user text into Python code to create a relevant visualization search. The user may ask a visualization question and, in response, the multi-agent system 50 can a) help generate Python visualization code, b) validate it, and c) execute it. An example of a type of question that may be handled by the Python agents 58 may be considered to be a "data visualization" query, such as, "Plot the ZPA utilization rate of the top churn risk account in a month-to-month basis." For example, the response may include a graph showing the relevant utilization rate on a month-to-month basis of the ZPA product that has the highest churn risk. The multi-agent system 50 may therefore be configured to determine if the user query is a data-relevant query or a data visualization query and respond accordingly.

In some embodiments, the UI 52 may be an LLM chatbot. Each of the search agents 54, SQL agents 56, and Python agents 58 may be configured as LLM agents. Each LLM agent may include a tool use, planning component, a reasoning component, and memory (i.e., for storing search results beyond just the immediate query conversation).

As described in the present disclosure, an agent (e.g., AI agent, LLM agent, etc.) may be different from a typical ChatGPT element. In the present embodiments, an agent may basically be defined by four general building blocks to allow the respective agent to know how to use a specific tool. For instance, an agent can have a code execution environment and can write and execute a code. In some embodiments, the agent can reach out to Snowflake or other similar service to run a SQL query for the user and the agent can utilize these or other external APIs that may be defined by the user.

The memory of an agent is not only applicable in a situation such as a ChatGPT session, where memory simply stores a record of an ongoing conversation history, which can be referred to as the short term memory for in-context learning. However, the memory in the agents described herein may have long term memory that allows the agent to connect to an external database (e.g., data storage device 40) and have access to an indefinite recall for relevant information from the database. The agent may also be set up with an external database for knowledge, injection, for a help desk document, for relevant table schemas and calling information, etc.

Another building block of the agents is the planning component, which gives the agent the ability to plan how to execute the specific task or fulfill the specific role for which it is called or prompted. Thus, when the agent encounters a complicated question or user query, the multi-agent system 50 may be configured to decompose or break down a task into manageable pieces to allow the agent to solve it (or solve a part of the task along with the help of other agents working on other parts).

Furthermore, an agent is configured to know how to reason using the building block referred to as the reasoning component. Thus, not only can the agent give a relevant output, but it can also generate thought traces related to the output. Therefore, if the user requests, the thought traces (or reasoning process) can be conveyed to the UI 52 to explain why it does what it does.

In some embodiments, the multi-agent system 50 may further be configured to perform auto-correction functionality. As suggested above, an LLM can make mistakes, particularly since it relies on a vast amounts of data and it can too easily produce hallucinations, misinformation, and other errors. However, with the help of other AI agents (or LLM agents), particularly agent designed or prompted to act as a reviewer or evaluator, other agents can identify mistakes. It may be helpful that each agent is configured to operate independently or autonomously, since this may enable each agent to perform one role particularly well, while it might not be as proficient at other tasks. Therefore, the various AI agents can rely on the help from others to identify and/or correct mistakes during the process of conducting a search to have satisfactory answers. Also, in some embodiments, the multi-agent system 50 may include a timeout process for stopping any task that takes too much time.

With respect to the concept of moving from a single agent (as described in many conventional systems) to a system with multiple AI agents (as described in the present disclosure), certain benefits may arise. For example, a multi-agent system is configured to reduce hallucinations. One agent may make a mistake or produce inaccurate results, but another agent may follow up and fix that mistake. Also, with data-related questions, there may only be one right answer.

Furthermore, multi-agent systems may allow for specialization and expertise for different tasks or roles. This may be applicable regarding "hiring ahead of the curve." Also, low switching costs may result from emerging specialized LLMs (e.g., "copilots"). Also, multiple AI agents are configured to help with scalability and modularity of an enterprise system. The system may reuse the same agents for various use cases. Also, this arrangement may make it easy for benchmark and evaluation. In some cases, the systems may have an Auto-Gen multi-agent framework, including, for example, a chat manager that can pick the next agent to speak (chat) with respect to their unique role or functionality. The AutoGen system may also include a reviewer, a coder, and a planner, having similarities to the AI agents described with respect to FIG. 1.

An architecture of the multi-agent system 50 (e.g., query system 14, system 30, etc.) may include a Data Warehouse, which may be configured to store information, files, documents, etc. regarding customer health, ML model churn predictions, etc. The architecture may also include one or more containers, such as Microsoft Research, AutoGen, Snowflake Cortex AI, Microsoft Azure, OpenAI ChatGPT, etc. Also, the architecture of the multi-agent system 50 may include one or more Inference Apps, such as Streamlit, Zscaler, etc.

It may be noted that solving text-to-SQL conversion can be a challenge in many respects. For example, real-world data is typically large and messy. An enterprise data store may typically include hundreds of tables and thousands of columns. Also, column names may often be ambiguous. Furthermore, a challenge with text-to-SQL conversion may include the fact that JOIN paths are typically complicated and there may be a lack of semantic information. Also, another text-to-SQL challenge is that WHERE clauses are typically inaccurate and there may also be a lack of sample values. As such, text-to-SQL conversion can be reduced to a search problem.

Data Retrieval

Figure 4:
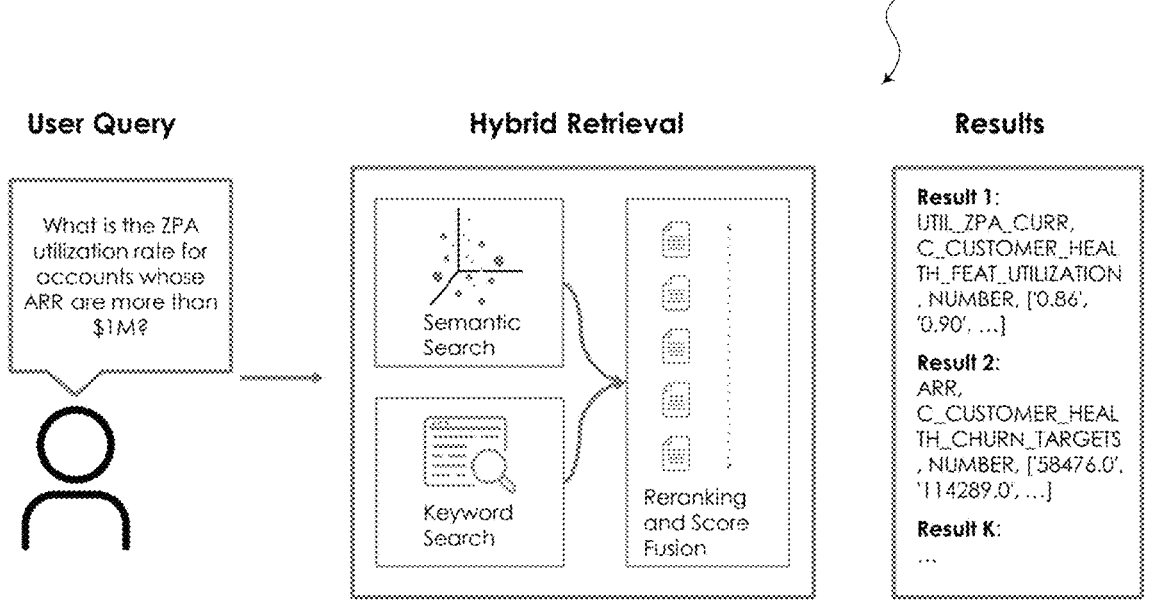
FIG. 4 is a diagram illustrating a hybrid retrieval device for conducting a search in response to a user query, according to various embodiments.

FIG. 4 is a diagram illustrating an embodiment of a hybrid retrieval system 60 configured for data or knowledge retrieval when conducting a search in response to a user query. In the embodiment of FIG. 4, the hybrid retrieval system 60 includes a component for receiving a user query. The user query is fed to a hybrid device for retrieving data or knowledge from a database, data storage device, data lake, knowledge base, etc. The hybrid device includes a combination of functionality for handling a semantic search and/or keyword search, functionality for reranking the results based on certain criteria, and functionality for performing a score fusion step for determining weights or scores for various results.

The hybrid retrieval system 60 shows a comprehensive workflow that demonstrates how the query system 14, system 30, and/or multi-agent system 50 operate. Whenever a user asks a question, the type of question may be identified as a data visualization question, which may result in an answer in the form of a graph, table, chart, or other diagrammatic expression. In this case, a search is triggered and executed by a search agent (e.g., search data engineer). It may find certain documents, which the critique agent (e.g., search evaluator 22) can evaluate to determine if the documents are valid for the particular data visualization question and whether they are really relevant to answer the user's question. If not, the system can augment upon the search and try searching one more time until the retrieved documents are found to be valid.

Once relevant documents have been found and retrieved, the system can extract table schemas from these relevant documents. This may be key to enabling a reliable SQL generation, because without a relevant table schema, the SQL generation might not make sense. The SQL agent in this case may be configured to write SQL and the SQL code reviewer (e.g., code evaluator 26) is configured to evaluate the SQL code to check if the SQL is actually executable, whether data objects are living in an LLM combination service (e.g., Snowflake). Once this SQL code is validated, the system can pass it to a Python agent (e.g., Python agents 58), which is configured to write a Python code for visualization. A Python reviewer (e.g., code evaluator 26) is configured to critique the created Python code, and once it passes the code as executable, the code is passed to a co-executor agent (e.g., the search data engineer 20). In some embodiments, this agent may operate independently of the search data engineer 20 that is configured to assume other roles. Thus, the co-executor agent can execute the Python code, create or obtain visualization elements, and return the answer to the user in the form of a graph, chart, table, etc.

Examples of Different Types of Queries

Figure 5:
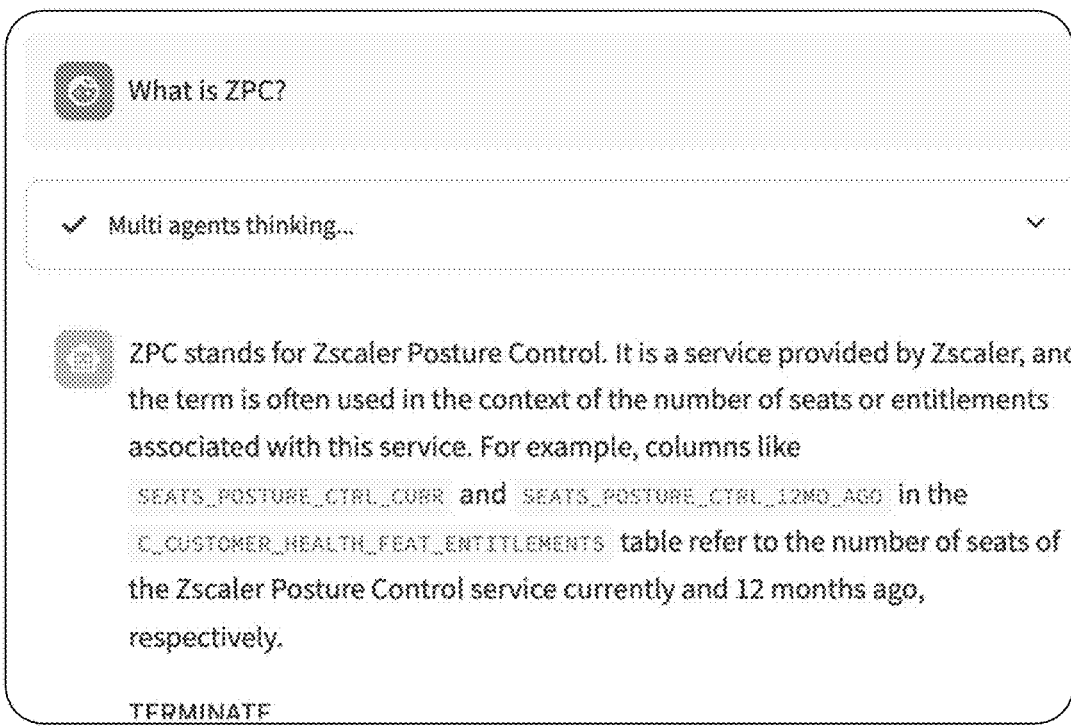
FIGS. 5-7 are screenshots showing user queries and various responses by the query system of FIG. 1 based on the type of query received, according to various embodiments.

FIGS. 5-8 are screenshots showing examples of user queries and various responses by the query system of FIG. 1 based on the type of query received. For example, FIG. 5 shows a screenshot in which a user enters a query (e.g., in a search field) asking, "What is ZPC?" This type of question, for instance, may be related to Retrieval-Augmented Generation (RAG) or may be referred to as a RAG-based question. With a RAG-based QA query, for example, a user may ask questions about customer health, generic database information, or other inquiries that are simple and/or do not require breaking down into parts. The multi-agent system 50 (e.g., query system 14, system 30, etc.) may then be configured to help the user find the relevant information. Thus, in response to this RAG-based query about Zscaler's terminologies, the system may give the answer:

"ZPC stands for Zscaler Posture Control. It is a service provided by Zscaler, and the term is often used in the context of the number of seats or entitlements associated with this service. For example, columns like SEATS_POSTURE_CTRL_CURR and SEATS_POSTURE_CTRO_12MO_AGO in the C_CUSTOMER_HEALTH_FEAT_ENTITLEMENTS table refer to the number of seats of the Zscaler Posture Control service currently and 12 months ago, respectively."

Figure 6:
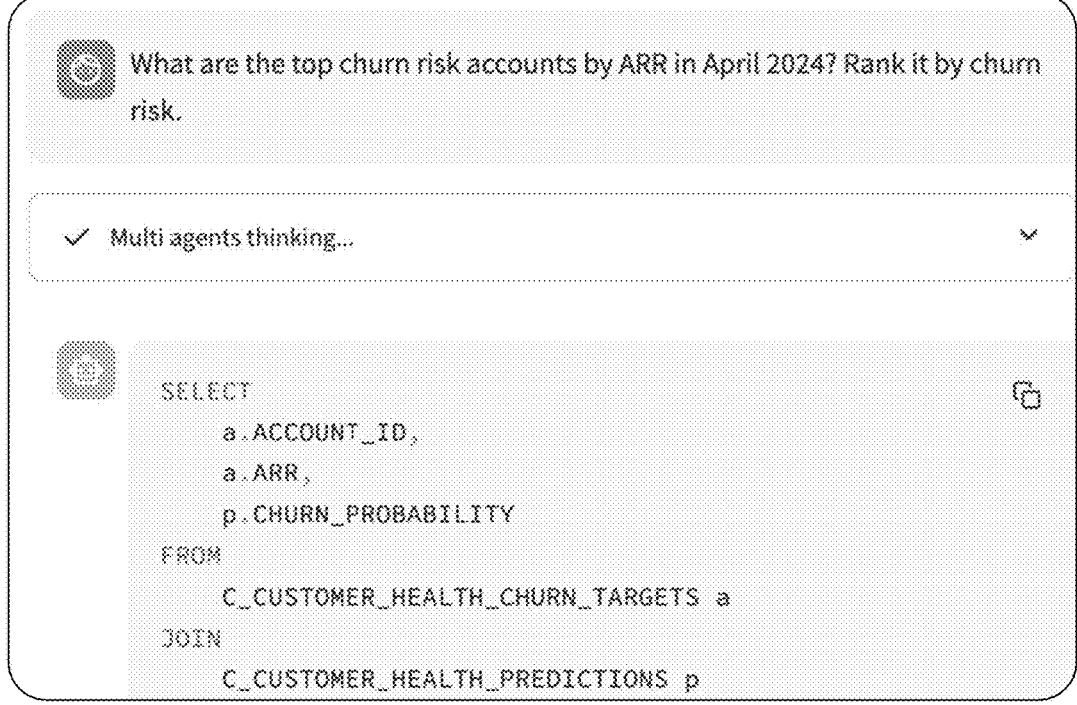

As shown in the screenshot of FIG. 6, an example is illustrated where a user enters a query asking, "What are the top churn risk accounts by ARR in April 2024? Rank them by churn risk?" This type of question, for instance, may be related to text-to-SQL question. With a text-to-SQL query, for example, a user may ask questions about data-relevant inquiries. The system can answer SQL queries to help write the SQL code and validate it. The multi-agent system 50 (e.g., query system 14, system 30, etc.) may then be configured to help the user find the relevant information. Thus, in response to this data-relevant query about the accounts with the greatest risk of churn by ARR during a certain month, ranked by churn risk, the system may generate the SQL code as shown in FIG. 6.

Figure 7:
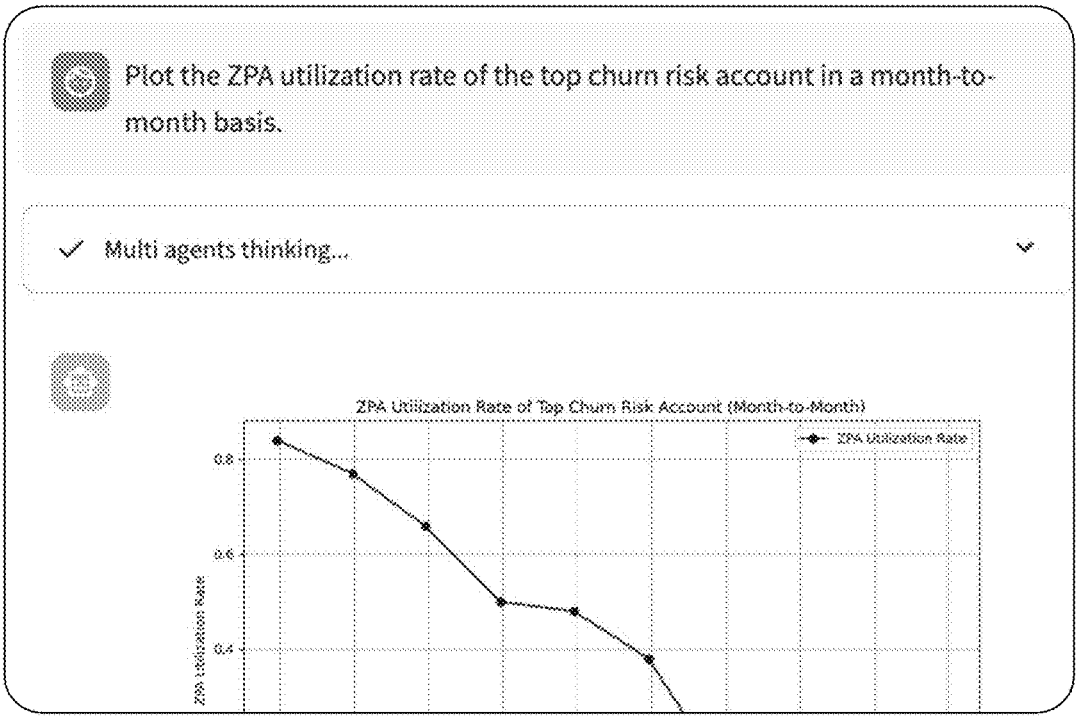

As shown in the screenshot of FIG. 7, an example is illustrated where a user enters a query, "Plot the ZPA utilization rate of the top churn risk account in a month-to-month basis." This type of question, for instance, may be related to text-to-visualization query or text-to-Python query. With a text-to-visualization query, for example, a user may ask questions about data that results in an answer shown visually, such as in a graph. The system can answer by Python queries to help write the Python code and validate it. The multi-agent system 50 (e.g., query system 14, system 30, etc.) may then be configured to help the user find the relevant information and generate a visual representation. Thus, in response to this visualization type query about plotting utilization rate of an account with the highest churn risk in a month-to-month format, the system may generate the graph as shown in FIG. 7.

Semantic Search

FIG. 8 is a diagram illustrating an example of how semantic retrieval 70 works with the query system 14 shown in FIG. 1. The searching may include chunking processes, embedding processes, and/or searching processes. Also, in some embodiments, the search results may be plotted in a three-dimension space, whereby a cosine similarity procedure can be conducted to determine the similarities between different semantic terminology. For example, the queries "How old are you?" and "What is your age?" may have a relatively high cosine similarity score, while the query "How are you?" may be found to have a low cosine similarity score with respect to the first two queries.

Chain-Based Processing Vs. Mesh-Based Processing

FIG. 9 is a diagram 80 illustrating differences between a chain-based search 82 and the multi-agent framework 84 (e.g., mesh-based processing) of the query system of FIG. 1. Again, the chain-based search 82 is a one-dimensional type of search that has a rigid flow path for creating a query for presentation to a search engine. Thus, the chain-based search 82 may produce errors or low accuracy results. On the other hand, the multi-agent framework 84 or agentic search, as may be incorporated in the systems having multiple AI agents described with respect to the embodiments of the present disclosure, is configured to include a flexible flow process. As such, each of the multiple agents in the multi-agent framework 84 can act autonomously yet also act in cooperation with the other agents to collaboratively produce valid search strategies, determine types of queries, evaluate the results of certain functions to allow for modification of errant results, etc., as described herein.

Semantic Layer

Figure 10:
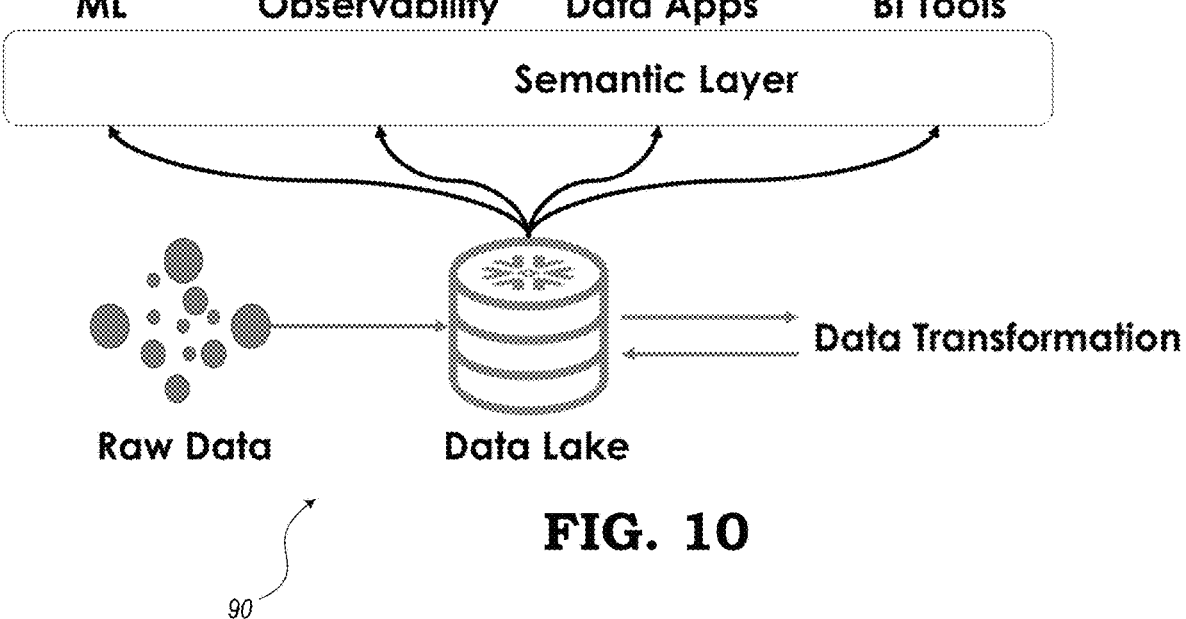
FIG. 10 is a diagram illustrating a semantic layer sitting on top of a database of an enterprise system, according to various embodiments.

FIG. 10 is a diagram illustrating an embodiment of a semantic layer 90 sitting on top of a database (or data lake) of an enterprise system. The systems and methods of the present disclosure may include a scalable workflow for processing enterprise data. In some embodiments, the semantic layer 90 may be built on top of enterprise data (e.g., Snowflake tables). While building data models, an enterprise may ensure that the description or rules of datasets and columns are being properly established. Whenever a new table or new use case is introduced, the data layer 90 may be configured to leverage discovery API to pull particular column descriptions and dataset descriptions together with other table schemas so that the enterprise can use them to setup the various search services.

The semantic layer 90 is a concept that enables organizations to define, manage, and utilize consistent business metrics and data definitions across different tools and platforms. Essentially, it is a layer that sits on top of raw data, providing a unified way to interpret that data based on predefined business logic and rules. By centralizing these definitions, the semantic layer ensures that everyone in the organization, from data analysts to business users, uses the same metrics and interpretations, leading to more consistent and accurate insights.

In practical terms, the semantic layer 90 can be part of a broader ecosystem, which focuses on transforming raw data into analytics-ready data models. The semantic layer 90 allows teams to define metrics, dimensions, and other business logic directly within their models. This makes it easier to maintain and update definitions as business needs change. Additionally, by exposing these definitions to downstream tools (e.g., BI platforms), the semantic layer 90 ensures that analyses and reports are based on a single source of truth, reducing discrepancies, and enhancing trust in the data across the organization.

Method for Developing a Multi-Agent Query System

FIG. 11 is a flow diagram illustrating an embodiment of a method 100 for developing a multi-agent query system. In this embodiment, the method 100 includes prompting a first AI agent to act as a research analyst for performing a task of interpreting a natural language query from a user, wherein the natural language query relates to natural language to the one of text-to-SQL or text-to-Python (step 102); prompting a second AI agent to act as a search data engineer for performing a task of executing a search based on the natural language query (step 104); prompting a third AI agent to act as a code developer for performing a task of writing code based on the search (step 106); and providing the code for the one of text-to-SQL or text-to-Python (step 108), wherein the plurality of AI agents act autonomously yet collaboratively in a group chat environment.

Of note, the method 100 can be overseen by a chat manager AI agent that is in the group chat from the beginning, overseeing the chat history and picking the next speaker. In an embodiment, a user query is mapped to the project manager first and then follow the data flow in FIG. 3.

Additional Considerations

In some respects, each AI agent may have its own unique "personality." A control element with the query systems described herein may be configured to provide a prompt to each AI agent to inform that AI agent about its particular characteristics, roles, job descriptions, personality, limitations, etc. According to some embodiments, the instructions of prompts provided to each AI agent may be configured to enable the respective AI agent to take on specific role or act, perform, or play the part of a role or job that might normally be given to employees of an organization. For example, the control device may communicate to the code evaluator 26 that, "You are a code evaluator who evaluates SQL to determine if the SQL code can run without creating errors."

According to some embodiments, the chat manager 18 may be configured to allow one or more AI agents to operate at once. However, in some cases, the chat manager 18 may plan a specific sequence of actions and instruct each AI agent to operate within certain time limits and only after the previous action is complete.

In some implementations, the control device or chat manager 18 may be configured to provide feedback to each AI agent in order to encourage or discourage the AI agent based on its performance or behavior. For example, the control device or chat manager 18 may provide praise for a job well-done or include some type of real or fictitious reward system (e.g., "You've just earned yourself a $100 reward for executing that last job. Keep up the good work.").

Alternatively, the control device or chat manager 18 may provide negative feedback when the AI agent makes a mistake, causes undue delay, provides misinformation, etc. A response to negative behavior may result in feedback such as, "You need to improve upon that last job. The results were inaccurate. Instead of providing x, you provided y." Or perhaps, "You owe $100 for generating that hallucination in your last job. Please be more careful to take the critical details into consideration, particularly abc."

CONCLUSION

Those skilled in the art will recognize that the various embodiments may include processing circuitry of various types. The processing circuitry might include, but are not limited to, general-purpose microprocessors; Central Processing Units (CPUs); Digital Signal Processors (DSPs); specialized processors such as Network Processors (NPs) or Network Processing Units (NPUs), Graphics Processing Units (GPUS); Field Programmable Gate Arrays (FPGAs); or similar devices. The processing circuitry may operate under the control of unique program instructions stored in their memory (software and/or firmware) to execute, in combination with certain non-processor circuits, either a portion or the entirety of the functionalities described for the methods and/or systems herein. Alternatively, these functions might be executed by a state machine devoid of stored program instructions, or through one or more Application-Specific Integrated Circuits (ASICs), where each function or a combination of functions is realized through dedicated logic or circuit designs. Naturally, a hybrid approach combining these methodologies may be employed. For certain disclosed embodiments, a hardware device, possibly integrated with software, firmware, or both, might be denominated as circuitry, logic, or circuits "configured to" or "adapted to" execute a series of operations, steps, methods, processes, algorithms, functions, or techniques as described herein for various implementations.

Additionally, some embodiments may incorporate a non-transitory computer-readable storage medium that stores computer-readable instructions for programming any combination of a computer, server, appliance, device, module, processor, or circuit (collectively "system"), each potentially equipped with one or more processors. These instructions, when executed, enable the system to perform the functions as delineated and claimed in this document. Such non-transitory computer-readable storage mediums can include, but are not limited to, hard disks, optical storage devices, magnetic storage devices, Read-Only Memory (ROM), Programmable Read-Only Memory (PROM), Erasable Programmable Read-Only Memory (EPROM), Electrically Erasable Programmable Read-Only Memory (EEPROM), Flash memory, etc. The software, once stored on these mediums, includes executable instructions that, upon execution by one or more processors or any programmable circuitry, instruct the processor or circuitry to undertake a series of operations, steps, methods, processes, algorithms, functions, or techniques as detailed herein for the various embodiments.

While the present disclosure has been detailed and depicted through specific embodiments and examples, it is to be understood by those skilled in the art that numerous variations and modifications can perform equivalent functions or yield comparable results. Such alternative embodiments and variations, which may not be explicitly mentioned but achieve the objectives and adhere to the principles disclosed herein, fall within its spirit and scope. Accordingly, they are envisioned and encompassed by this disclosure, warranting protection under the claims associated herewith. Additionally, the present disclosure anticipates combinations and permutations of the described elements, operations, steps, methods, processes, algorithms, functions, techniques, modules, circuits, etc., in any manner conceivable, whether collectively, in subsets, or individually, further broadening the ambit of potential embodiments.

What is claimed is:

1. A query system having a framework, the query system comprising:

a plurality of Artificial Intelligence (AI) agents working to support one of text-to-Structured Query Language (SQL) or text-to-Python, wherein the plurality of AI agents are each executable on one or more processing devices, and wherein the plurality of AI agents include a first AI agent prompted to act as a research analyst for performing a task of interpreting a natural language query from a user, wherein the natural language query relates to natural language to the one of text-to-SQL or text-to-Python, wherein the first AI agent performs retrieval-augmented generation (RAG) to extract semantic information comprising column descriptions, table schemas, sample values, and data types necessary to accurately interpret the natural language query;

a second AI agent prompted to act as a search data engineer for performing a task of executing a search based on the natural language query, wherein the second AI agent executes a hybrid retrieval operation comprising semantic search, keyword search, reranking, and score fusion to improve accuracy of search results for structured data in response to the natural language query; and a third AI agent prompted to act as a code developer for performing a task of writing code based on the search, wherein the third AI agent generates executable SQL or Python code based on semantic information obtained by the first AI agent and validated search results from the second AI agent, and further wherein the executable code is automatically validated against predetermined criteria prior to execution, wherein the plurality of AI agents act autonomously yet collaboratively in a group chat environment to manage interactions among the plurality of AI agents and determine which of the plurality of AI agents performs a respective task and in what order, thereby reducing inaccuracies in query results and computational errors arising from autonomous agent operations.

2. The query system of claim 1, further comprising a fourth AI agent prompted to act as a manager to a) manage interactions among the plurality of AI agents, b) determine which the plurality of AI agents perform their respective tasks, and c) broadcast results obtained by one AI agent upon performing its respective task to other AI agents.

3. The query system of claim 1, further comprising a fourth AI agent prompted to act as a search evaluator for performing a task of evaluating whether data obtained by the second AI agent prompted to act as the search data engineer when executing the search is relevant.

4. The query system of claim 3, wherein, in response to determining that results of executing the search are not relevant, the fourth AI agent prompted to act as the search evaluator is configured to provide feedback to the second AI agent prompted to act as the search data engineer.

5. The query system of claim 1, wherein the third AI agent prompted to act as the code developer is a text-to-SQL developer and is configured to write SQL code for assisting the second AI agent prompted to act as the search data engineer with queries related to general data and customer health.

6. The query system of claim 1, wherein the third AI agent prompted to act as the code developer is a text-to-visualization developer and is configured to write Python code for assisting the second AI agent prompted to act as the search data engineer with queries related to visualization of data.

7. The query system of claim 1, further comprising a fourth AI agent prompted to act as a code evaluator for performing a task of evaluating the code written by the third AI agent prompted to act as code developer.

8. The query system of claim 1, wherein the fourth AI agent prompted to act as the code evaluator is further configured to provide feedback to the third AI agent prompted to act as the code developer for improving SQL queries and Python queries that do not meet validation criteria.

9. The query system of claim 1, wherein the first AI agent prompted to act as the research analyst is further configured to augment the natural language query from the user to improve search relevance.

10. The query system of claim 1, wherein each of the plurality of AI agents includes one or more of a tool component, a planning component, a reasoning component, and memory.

11. The query system of claim 1, further comprising a semantic layer that sits on top of an enterprise database for establishing a consistent data representation scheme.

12. The query system of claim 1, wherein the first AI agent prompted to act as the research analyst is further configured to present additional information to the user, upon request, of operational steps of one or more of the plurality of AI agents.

13. A method of operating a plurality of Artificial Intelligence (AI) agents to support one of text-to-Structured Query Language (SQL) or text-to-Python, the method comprising steps of:

prompting a first AI agent to act as a research analyst for performing a task of interpreting a natural language query from a user, wherein the natural language query relates to natural language to the one of text-to-SQL or text-to-Python, wherein the first AI agent performs retrieval-augmented generation (RAG) to extract semantic information comprising column descriptions, table schemas, sample values, and data types necessary to accurately interpret the natural language query;

prompting a second AI agent to act as a search data engineer for performing a task of executing a search based on the natural language query, wherein the second AI agent executes a hybrid retrieval operation comprising semantic search, keyword search, reranking, and score fusion to improve accuracy of search results for structured data in response to the natural language query;

prompting a third AI agent to act as a code developer for performing a task of writing code based on the search, wherein the third AI agent generates executable SQL or Python code based on semantic information obtained by the first AI agent and validated search results from the second AI agent, and further wherein the executable code is automatically validated against predetermined criteria prior to execution; and providing the code for the one of text-to-SQL or text-to-Python, wherein the plurality of AI agents are each executable on one or more processing devices and act autonomously yet collaboratively in a group chat environment manage interactions among the plurality of AI agents and determine which of the plurality of AI agents performs a respective task and in what order, thereby reducing inaccuracies in query results and computational errors arising from autonomous agent operations.

14. The method of claim 13, wherein the steps further include prompting a fourth AI agent to act as a manager to a) manage interactions among the plurality of AI agents, b) determine which the plurality of AI agents perform their respective tasks, and c) broadcast results obtained by one AI agent upon performing its respective task to other AI agents.

15. The method of claim 13, wherein the steps further include prompting a fourth AI agent to act as a search evaluator for performing a task of evaluating whether data obtained by the second AI agent prompted to act as the search data engineer when executing the search is relevant.

16. The method of claim 15, wherein, in response to determining that results of executing the search are not relevant, the fourth AI agent prompted to act as the search evaluator is configured to provide feedback to the second AI agent prompted to act as the search data engineer.

17. The method of claim 13, wherein the third AI agent to act as the code developer is a text-to-SQL developer and is configured to write SQL code for assisting the second AI agent prompted to act as the search data engineer with queries related to general data and customer health.

18. The method of claim 13, wherein the third AI agent to act as the code developer is a text-to-visualization developer and is configured to write Python code for assisting the second AI agent prompted to act as the search data engineer with queries related to visualization of data.

19. The method of claim 13, wherein the steps further include prompting a fourth AI agent to act as a code evaluator for performing a task of evaluating the code written by the third AI agent prompted to act as the code developer.

20. The method of claim 19, wherein the fourth AI agent to act as the code evaluator is further configured to provide feedback to the code developer for improving SQL queries and Python queries that do not meet validation criteria.

\* \* \* \* \*